United States Patent [19]

Nilsson et al.

[11] 4,407,073
[45] Oct. 4, 1983

[54] MEASURING APPARATUS FOR CHECKING A SPRING STRUT APPERTAINING TO THE FRONT WHEEL SUSPENSION OF A VEHICLE

[75] Inventors: Lars-Erik Nilsson; Tommy Löfling, both of Hedemora, Sweden

[73] Assignee: Aktiebolaget Samefa, Kungsoer, Sweden

[21] Appl. No.: 281,276

[22] Filed: Jul. 8, 1981

[51] Int. Cl.³ .............................................. G01B 5/14
[52] U.S. Cl. .................................... 33/203.18; 33/203
[58] Field of Search .......... 33/203.18, 203.2, 180 AT, 33/181 AT, 203.15, 203, 335, 203.21, 203.19

[56] References Cited

U.S. PATENT DOCUMENTS

| | | | |
|---|---|---|---|
| 2,516,497 | 7/1950 | Wilson | 33/203.15 |
| 2,846,774 | 8/1958 | Race | 33/335 |
| 3,266,163 | 8/1966 | Wilkerson | 33/181 AT |
| 3,409,991 | 11/1968 | Davis et al. | 33/336 X |
| 3,835,547 | 9/1974 | Rishovd | 33/180 AT |
| 4,321,754 | 3/1982 | Colby | 33/203.2 |

Primary Examiner—Charles E. Frankfort
Attorney, Agent, or Firm—Flynn, Thiel, Boutell & Tanis

[57] ABSTRACT

According to the invention, simple measuring apparatus (10) is produced which is designed to ascertain if a so-called spring strut (50) appertaining to the front wheel suspension in a vehicle has been deformed or more specifically if it has been bent, the apparatus being designed to be used primarily on wheels equipped with disc brakes. The apparatus is used in situ, i.e. on a spring strut (50) mounted in place in the vehicle, and it is necessary only for the wheel to be removed, with the tire and rim, so that the disc brake (40) is exposed. The measuring apparatus consists of an upright (12) which is attached to a base part (14, 20) designed to be attached, preferably by means of permanent magnets (24, 26), to the outside of the brake disc (40). The upright (12) bears movably a measuring arm (30) equipped with a length scale and projecting out from the upright (12) at right angles to the plane of the brake disc (40); this arm also bears movably a pointer device (36) which can be made to seek out the center (60) of the upper fixing (55) of the spring strut (50) in the bodywork. After this adjustment, the perpendicular distance (a) from the fixing center (60) to the plane of the brake disc (40) can be read off on the scale on the measuring arm (30). From the knowledge of this distance it can be established whether or not the spring strut (50) has been deformed (bent).

8 Claims, 5 Drawing Figures

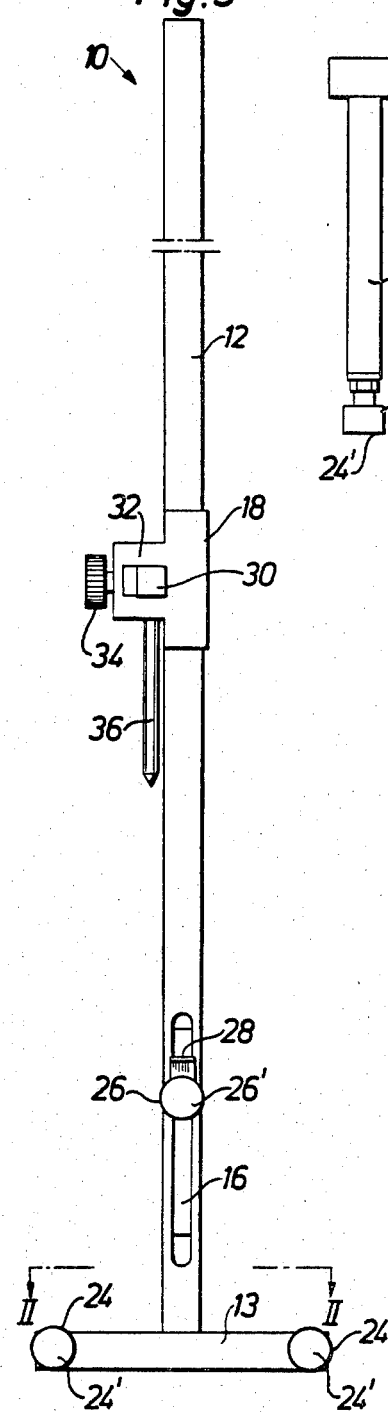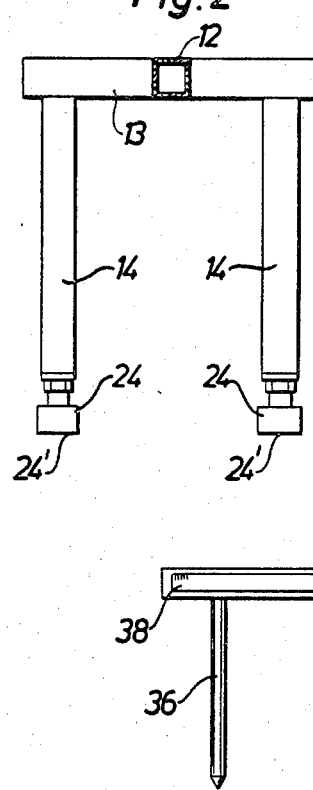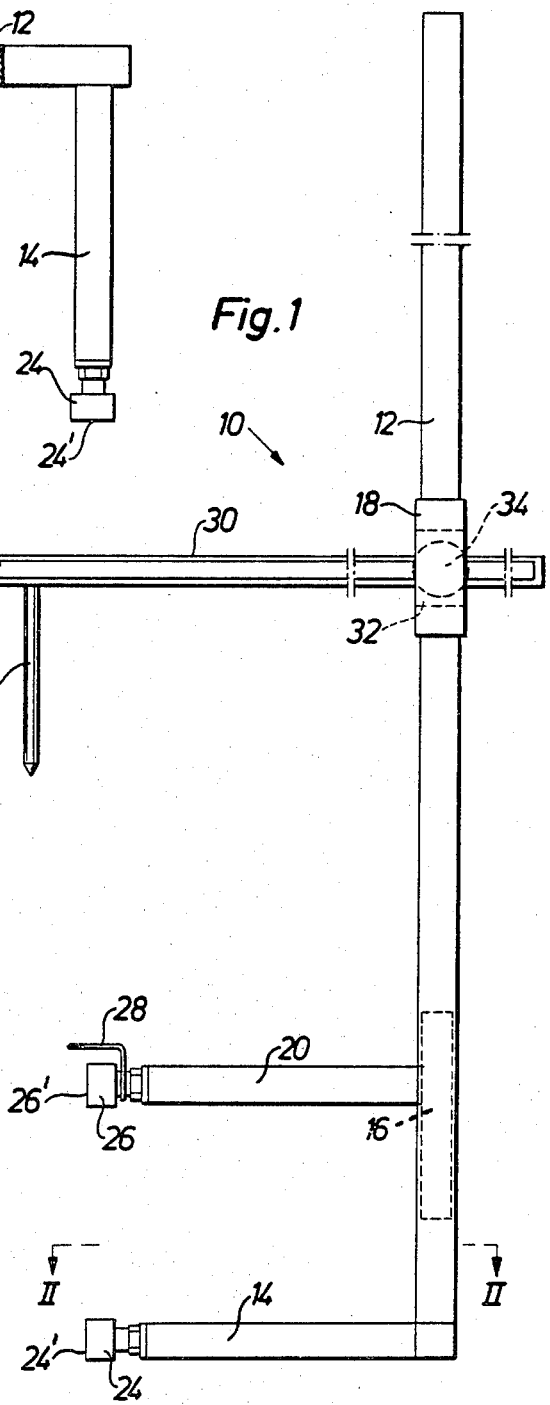

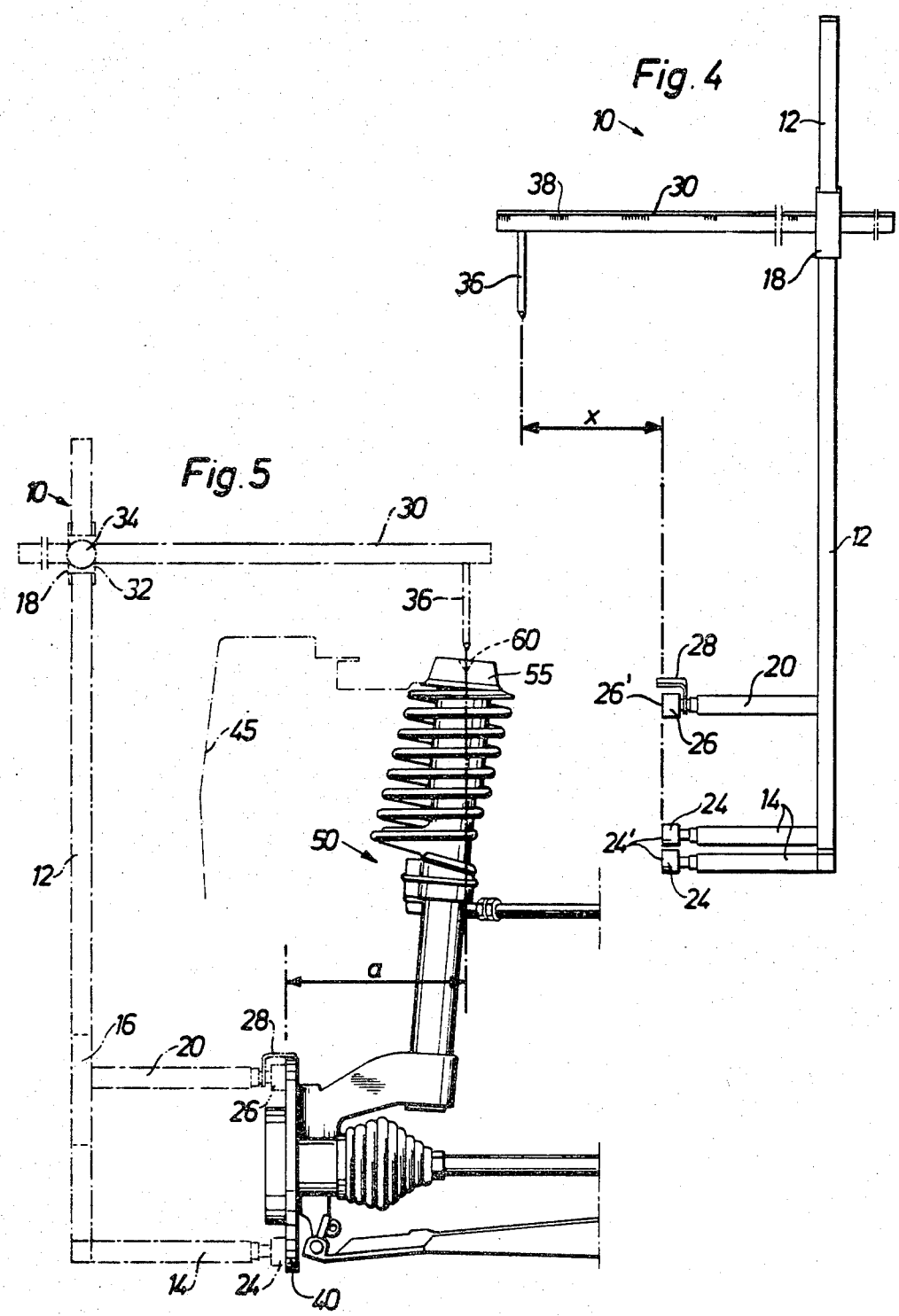

MEASURING APPARATUS FOR CHECKING A SPRING STRUT APPERTAINING TO THE FRONT WHEEL SUSPENSION OF A VEHICLE

The present invention relates to measuring apparatus for checking the springing and shock-absorbing component, known as the spring strut, which is incorporated in the wheel suspension of a vehicle, and more specifically the spring strut which forms part of the suspension of a front wheel equipped with disc brakes.

In front wheel suspension of the kind involved, the spring movements of the wheels in the vertical direction are generally taken up by a spring strut which conventionally comprises a springing element and a shock-damping device, and which extends centrally in relation to the wheel, from a point inside the latter directly above the centre of the wheel, obliquely upwards/inwards to a fixing point in the vehicle bodywork. This fixing point lies rather high, since the spring strut is fairly long. The mechanical arrangement is such that during operation the wheel can carry out its normal steering movements at the same time as its vertical movements occasioned by the unevenness of the roadway are absorbed and damped by the spring strut, which carries out telescopic movements simultaneously with a gentle swinging around the upper fixing point. It is of the utmost importance that the spring strut should remain straight, since the geometrical relationship is such that even a slight curvature of the strut can cause an unacceptable change in the setting of the wheel. Such a change means both that the tyre on the wheel is subjected to an unusual amount of wear and also that the steering geometry, and with it the driving characteristics, are impaired.

If the vehicle is subjected to crash damage, even very minor damage, and particularly, of course, if the front of the vehicle is subjected to this kind of damage, there is a risk that the bodywork will be somewhat deformed, so that the upper fixing point for one or both of the spring struts of the front wheels is displaced. This can be repaired, and it can be established with no great difficulty by subsequent measurement that the fixing have regained their correct positions.

However, there is also a high risk that one or both of the spring struts will have been bent, possibly without its fixing in the bodywork being displaced. If there is such bending of the spring strut and the curvature occurs in a plane which is more or less at right-angles to the plane of the wheel, the strut has to be changed even if the bending is very slight. This is because it is bending orientated in this way which has the above-mentioned serious effect on the setting of the wheel; bending in other planes does not have the same effect and can be tolerated readily.

Unfortunately, such damage, i.e. bending of the spring strut in a plane perpendicular to the plane of the wheel, is difficult to detect with the naked eye; as mentioned, it may be very slight but still have serious consequences for the setting of the wheel. In actual fact, this means that such damage can only be detected in current workshop practice by carrying out a complete wheel adjustment operation—if it is found impossible to install a front wheel in the prescribed way, this is an indication that the spring strut is bent in an unacceptable direction.

The above can be summed up in the following way: the fixing of the spring struts in the bodywork can be corrected in the conventional way after damage, such as crash damage for example, but it is not possible to establish with certainly if the spring struts are then holding the wheel in its correctly installed position, since a slight but still serious deformation (bending) of a strut may be invisable to the naked eye. Until now it has been possible to confirm damage of this kind only in the above-mentioned indirect way, thus, when a correct wheel installation cound not be accomplished. However, the fault is frequently not noticed—a slightly bent spring strut may in itself be capable of functioning—and a vehicle may leave the workshop with crash damage repaired although one or both of the front wheel spring struts are damaged. Until now, no method or apparatus has been proposed to remedy this deficiency.

The invention is therefore based on the problem of providing simple measuring and checking apparatus with the aid of which it can be established easily and quickly if a spring strut mounted in place has been bent. This problem is solved in that the measuring apparatus according to the invention is endowed with the characteristics listed in patent claim 1.

The invention will now be described in an exemplifying manner with reference to the attached drawings, on which FIG. 1 is a side view of the measuring apparatus according to the invention, while FIG. 2 is a partial plan view of the apparatus, partly sectioned along the line II—II in FIGS. 1 and 3. FIG. 3 is a side view perpendicular to the view shown in FIG. 1, while FIG. 4 is a perspective view of the apparatus on a smaller scale. Finally, FIG. 5 is a schematic view which illustrates how the measuring apparatus according to the invention is used in practice.

The measuring apparatus according to the invention is based on the fact that a bend in a spring strut as mentioned above must mean that the position of the upper fixing point of the strut relative to the actual wheel is changed. If the latter is equipped with a disc brake, its brake disc, which always has a specific fixed position relative to the wheel, may be taken as a starting point for establishing the said measurement changes. The measuring apparatus according to the invention is therefore designed to determine the perpendicular distance from the plane through the outer face of the brake disc to the fixing point of the spring strut. If this distance differs from a given normal value, the strut has been bent.

The measuring apparatus is designated 10 as a whole, and comprises an upright 12 which is rigidly attached via a cross piece 13 at its lower end to two legs 14 projecting at right-angles from the upright 12 and extending substantially parallel to each other (see FIG. 2). The upright 12 is preferably made of four-sided lightweight metal tube, and two sleeves 16 and 18 are slidably disposed on the upright, similarly made of four-sided light-weight metal tube (sleeve 16 being received in the interior of the upright). From the sleeve 16 a third leg 20 extends out at right-angles to the sleeve 16 and thus to the upright 12. Since the sleeve 16 can slide in the upright, the leg 20, which extends substantially parallel to the legs 14, can be moves in the vertical direction and adjusted in a desired position on the upright 12. Strong permanent magnets 24 and 26 are attached to the outer end of the legs 14 and 20 respectively, the magnet 26 on the leg 20 being somewhat larger than the magnets 24 on the legs 14. The legs are designed so that the attaching or attraction surfaces 24' and 26' of the respective magnets lie in the same plane, irrespective of the position of the sleeve 16 on the upright 12. The leg 20 is also equipped with an arrangement comprising a supporting pin 28 which is located above the magnet 26 and projects slightly beyond its attraction surface 26'. The task of the supporting pin 28 will be made clear in the following.

The upper sleeve 18 which can slide on the upright 12 bears a measuring arm 30 which projects substantially perpendicularly from the upright and is made of the same material as the upright 12. The measuring arm 30 is slidable in a sleeve 32 united with the sleeve 18, and by means of a locking knob 34 the arm 30 can be fixed in the sleeve 32. However, the sleeve 18 which can slide on the upright and bears the measuring arm 30 does not require any special locking knob, the sleeve 18 being held by a friction arrangement (not shown in detail) so that it remains in each set position on the upright 12 due to the moment which the relatively long measuring arm 30 exerts. The same applies to the adjustment of sleeve 16 in upright 12.

As can be seen in FIG. 1, a pointer or indicator needle 36 is disposed adjacent the free end of the measuring arm 30. On the arm there is also a longitudinally extending mm scale 38, the arrangement being such that an indicator (not shown in detail) on the sleeve 32 allows the perpendicular distance between the point of the pin 36 and the plane through the surfaces 24' and 26' of the magnets to be read off on the scale 38, as will be described.

FIG. 4 thus shows a perspective view of the entire measuring arrangement. The holding surfaces 24' and 26' of the magnets 24 and 26 respectively form a starting plane or reference plane for the measuring process, this plane being made to coincide with the outer face of the brake disc of a vehicle wheel on which the magnets are designed to stick fast, thereby supporting the measuring apparatus on the brake disc as will be described. Adaption to the size of the brake disc is achieved by moving the sleeve 16 in the upright 12, and in order that the magnets do not have to support the whole weight of the measuring apparatus the apparatus is placed on the brake disc so that the supporting pin 28 rests on the upper edge of the disc. By moving the sleeve 18 on the upright 12 and the measuring arm 30 in its sleeve 32 (see FIG. 3) until the point of the indicator needle 36 coincides with a given point, based on the given conditions, the perpendicular distance between its point and the plane through the surfaces 24' and 26' of the magnets, i.e. the plane of the brake disc, can be read off on the scale 38, as will be described with reference to FIG. 5.

FIG. 5 illustrates how the measuring apparatus 10 according to the invention is actually used. The Figure shows schematically how a brake disc 40 appertaining to the front wheel of a vehicle is orientated in relation to the wheel spring strut 50 mentioned in the introduction. The mechanical components contained in such wheel suspension are shown indicatively, and no more detailed description of them is required. The upper fixing 55 of the spring strut 50 is assumed to be in the correct place on the bodywork and the mudguards surrounding the wheel and the adjoining bodywork parts are indicated at 45. The centrepoint of the fixing 55 is indicated at 60.

The measuring process is carried out as follows: To prepare for measuring it is necessary only for the wheel to be jacked up in the usual way and for the tyre with its associated rim to be taken off so that the disc 40 of the disc brake is exposed. The measuring apparatus 10 is attached to the brake disc 40 by means of the magnets 24 and 26 after the sleeve 16 has been fixed in an appropriate position on the upright 12, the supporting pin 28 being brought to rest on the upper edge of the disc. The sleeve 18 and the measuring arm 30 can now be adjusted on the upright 12 and in the sleeve 32 respectively so that the point of the indicator needle 36 points directly to the centre 60 of the upper fixing 55 of the spring strut 50. It will be noted that the measuring apparatus entirely "encircles" the mudguards 45 which do not therefore need to be moved, since the centre 60 can be reached by the indicator needle 36 without any difficulty.

The perpendicular distance $x=a$ from the centre 60 to the plane through the outer face of the brake disc 40 can now be read off easily on the scale 38. If the value which is read off falls outside established, relatively narrow limits, this indicates that the strut has been bent and must be changed.

It is therefore the distance a according to the above definition which is of interest for the measurement, which means that the measuring apparatus 10 can be applied to the brake disc 40 in a substantially aribitrary lateral position; it is the parallelity of the upright 12 with the plane of the disc which is essential. Consequently, the movement of the measuring apparatus 10 along the plane of the brake disc has no effect, although it should not be tilted relative to this plane.

The measurements can be either absolute or relative, i.e. if the measuring apparatus 10 is made with a good degree of precision and the scale 38 is graduated in a suitable way, the arrangement can be calibrated so that the absolute measurement a can be read off on the scale 38. However, in practice it may be equally expedient to use the apparatus for relative measurement, i.e. a measurement value is read off with the measuring apparatus attached to an exactly identical type of vehicle (or wheel suspension) to that which is to be checked and wherein it is known that the spring strut has no fault. Any possible deviation from the correct measurement a can then easily be confirmed in the checked vehicle. Also, special calibration adapted to the measuring apparatus of the invention can be produced for various types of vehicles and suspension.

Naturally, the invention is not limited to the embodiment of the measuring apparatus shown and exemplified here. Although the magnets 24 and 26 provide simple and easily handled means for attaching the measuring apparatus to a brake disc, simple clamping arrangements, for example, which engage on the edge of the disc could also be envisaged. The supporting pin 28 is not an absolutely essential part but may be omitted. In other respects as well, a worker in this field will be able to propose modifications to the measuring apparatus according to the invention without exceeding the scope thereof.

We claim:

1. Measuring apparatus for checking a so-called spring strut of the type which is used in the front wheel suspension of a vehicle equipped with disc brakes incorporating a brake disc exposable by removal of a corresponding vehicle wheel and tyre, the measuring apparatus being designed to detect any displacement relative to the wheel of an upper fixing of the associated spring strut in the vehicle bodywork which may arise, and which is an indication of possible deformation of the strut and means a serious fault in the setting of the wheel and thus also in the steering geometry of the vehicle, the measuring apparatus comprising an upright, a base part which is attached to and projects out from the upright, the base part being equipped with fixing means removably fixable on the outer face of the exposed brake disc for supporting the upright on the brake disc and substantially parallel to the plane of the brake disc, a measuring arm which is adjustably mounted on the upright and which extends out from the upright in a direction perpendicular to said plane of the brake disc, said measuring arm carrying an indicator or pointer arrangement, the arrangement being such that the centre of the said upper fixing of the spring strut can be sought out by the pointer arrangement by moving the measuring arm, so that the perpendicular distance (a) between the plane of the brake disc and the centre of said upper fixing can be read from the position of the pointer arrangement on the measuring arm.

2. Measuring apparatus for checking a so-called spring strut of the type which is used in the front wheel suspension of a vehicle, and more specifically for such a wheel which is equipped with disc brakes, the measuring apparatus being designed to establish in such a wheel any displacement relative to the wheel of an upper fixing of the associated spring strut in the vehicle bodywork which may arise, and which is an indication of possible deformation of the strut and means a serious fault in the setting of the wheel and thus also in the steering geometry of the vehicle, the measuring apparatus comprising an upright attached to a base part which projects out from the upright and is equipped with fixing devices, the fixing devices being designed so that when the wheel, with the tyre and the rim, has been removed and the disc brake is exposed, such fixing devices engage on the outer face of the brake disc so that the base part supports the upright substantially parallel to the plane of the disc, a measuring arm which can be moved relatively to the upright and which extends out from the upright in a direction perpendicular to the plane of the brake disc and carries an indicator or pointer arrangement, the pointer arrangement being such that the centre of the said upper fixing of the spring strut can be sought out by the pointer arrangement by moving the measuring arm, so that the perpendicular distance (a) between the plane of the brake disc and the centre of said upper fixing can be read off in absolute or relative values on the measuring arm, the fixing devices for the base part comprising permanent magnets designed to engage on the outer face of the brake disc.

3. Measuring apparatus for checking a so-called spring strut of the type which is used in the front wheel suspension of a vehicle, and more specifically for such a wheel which is equipped with disc brakes, the measuring apparatus being designed to establish in such a wheel any displacement relative to the wheel of an upper fixing of the associated spring strut in the vehicle bodywork which may arise, and which is an indication of possible deformation of the strut and means a serious fault in the setting of the wheel and thus also in the steering geometry of the vehicle, the measuring apparatus comprising an upright attached to a base part which projects out from the upright and is equipped with fixing devices, the fixing devices being designed so that when the wheel, with the tyre and the rim, has been removed and the disc brake is exposed, such fixing devices engage on the outer face of the brake disc so that the base part supports the upright substantially parallel to the plane of the disc, a measuring arm which can be moved relatively to the upright and which extends out from the upright in a direction perpendicular to the plane of the brake disc and carries an indicator or pointer arrangement, the pointer arrangement being such that the centre of the said upper fixing of the spring strut can be sought out by the pointer arrangement by moving the measuring arm, so that the perpendicular distance (a) between the plane of the brake disc and the centre of said upper fixing can be read off in absolute or relative values on the measuring arm, the base part comprising two fixed legs projecting out from a cross piece on the upright, and also a third movable leg coacting with the former legs and disposed on the upright.

4. Apparatus according to claim 3, wherein said third movable leg is equipped with a projecting supporting heel, supporting pin or the like, disposed on the outer end of the leg and designed to rest on the upper edge of the brake disc when the base part is applied thereto, and to transfer some of the weight of the measuring apparatus to the disc.

5. Apparatus according to claim 3, wherein the third leg of the base part and the measuring arm have connected thereto respective sleeves which in turn are slidably connected to the upright, the sleeves being equipped with friction or locking devices, by means of which they can be held securely in a desired position on the upright.

6. Apparatus according to claim 5, wherein the indicator or pointer arrangement comprises a needle, a pointer or similar member, which projects out from the measuring arm, the measuring arm being slidably received in a further sleeve united with said measuring arm connected sleeve slidably connected to the upright, a friction or locking arrangement being provided for holding securely the measuring arm in a desired position in said further sleeve.

7. Apparatus according to claim 5 or 6, wherein the upright and the measuring arm are made of four-sided light-weight metal tube, while the sleeves slidably connected to the upright are similarly made of four-sided light-weight metal tube with dimensions such that they engage the four-sided tube of the upright with a sliding fit.

8. Apparatus according to any one of claims 1, 2, 3 or 4, wherein the measuring arm is equipped with a graduated length scale from which the position of the pointer arrangement can be read.

* * * * *